US011006216B2

United States Patent
Mariglio, III

(10) Patent No.: US 11,006,216 B2
(45) Date of Patent: May 11, 2021

(54) NONLINEAR ADAPTIVE FILTERBANKS FOR PSYCHOACOUSTIC FREQUENCY RANGE EXTENSION

(71) Applicant: Boomcloud 360, Inc., Encinitas, CA (US)

(72) Inventor: Joseph Anthony Mariglio, III, Encinitas, CA (US)

(73) Assignee: Boomcloud 360, Inc., Encinitas, CA (US)

(*) Notice: Subject to any disclaimer, the term of this patent is extended or adjusted under 35 U.S.C. 154(b) by 0 days.

(21) Appl. No.: 16/986,792

(22) Filed: Aug. 6, 2020

(65) Prior Publication Data

US 2021/0044898 A1 Feb. 11, 2021

Related U.S. Application Data

(60) Provisional application No. 62/884,607, filed on Aug. 8, 2019.

(51) Int. Cl.
*H04R 3/04* (2006.01)
*G06F 3/16* (2006.01)
*H04R 3/00* (2006.01)

(52) U.S. Cl.
CPC .......... *H04R 3/04* (2013.01); *G06F 3/16* (2013.01); *H04R 3/007* (2013.01)

(58) Field of Classification Search
CPC .............. G06F 3/16; H04R 3/007; H04R 3/04
(Continued)

(56) References Cited

U.S. PATENT DOCUMENTS 9,641,191 B1 * 5/2017 Volfbeyn ............ H03M 1/0626
2006/0280310 A1 12/2006 Wildhagen
(Continued)

FOREIGN PATENT DOCUMENTS

| KR | 10-2016-0075806 A | 6/2016 |
| TW | I483594 B | 5/2015 |
| TW | I645723 B | 12/2018 |

OTHER PUBLICATIONS

PCT International Search Report and Written Opinion, PCT Application No. PCT/US2020/045137, dated Nov. 20, 2020, nine pages.
(Continued)

*Primary Examiner* — Vivian C Chin
*Assistant Examiner* — Friedrich Fahnert
(74) *Attorney, Agent, or Firm* — Fenwick & West LLP

(57) ABSTRACT

A system includes a circuitry that provides for psychoacoustic frequency range extension for a speaker. The circuitry generates quadrature components from an audio channel, and generates rotated spectral quadrature components by applying a forward transformation that rotates a spectrum of the quadrature components from a standard basis to a rotated basis. In the rotated basis, the circuitry isolates components of the rotated spectral quadrature components at target frequencies, and generates weighted phase-coherent harmonic spectral quadrature components by applying a scale-independent nonlinearity to the isolated components. The circuitry generates a harmonic spectral component by applying an inverse transformation that rotates a spectrum of the weighted phase-coherent harmonic spectral quadrature components from the rotated basis to the standard basis. The circuitry combines the harmonic spectral component with frequencies of the audio channel outside of the target frequencies to generate an output channel, and provides the output channel to the speaker.

33 Claims, 7 Drawing Sheets

(58) Field of Classification Search
USPC .......................................................... 381/98
See application file for complete search history.

(56) References Cited

U.S. PATENT DOCUMENTS

| 2010/0063827 | A1 | 3/2010 | Gao |
| 2012/0163627 | A1 | 6/2012 | Goodson et al. |
| 2016/0155448 | A1 | 6/2016 | Purnhagen et al. |
| 2016/0267917 | A1 | 9/2016 | Disch et al. |
| 2017/0069333 | A1 | 3/2017 | Mamola |

OTHER PUBLICATIONS

Taiwan Intellectual Property Office, Office Action, TW Patent Application No. 109126951, dated Feb. 26, 2021, seven pages.

\* cited by examiner

600

```
┌─────────────────────────────────────────────────────────────────┐
│ Generate quadrature components defining a quadrature            │
│ representation of an audio channel                              │
│ 605                                                             │
└─────────────────────────────────────────────────────────────────┘
                                  ↓
┌─────────────────────────────────────────────────────────────────┐
│ Generate rotated spectral quadrature components by applying a   │
│ forward transformation that rotates a spectrum of the           │
│ quadrature components from a standard basis to a rotated basis  │
│ 610                                                             │
└─────────────────────────────────────────────────────────────────┘
                                  ↓
┌─────────────────────────────────────────────────────────────────┐
│ Isolate components of the rotated spectral quadrature           │
│ components at target frequencies and target magnitudes          │
│ 615                                                             │
└─────────────────────────────────────────────────────────────────┘
                                  ↓
┌─────────────────────────────────────────────────────────────────┐
│ Generate weighted phase-coherent harmonic spectral quadrature   │
│ components by applying a scale-independent nonlinearity to the  │
│ isolated components                                             │
│ 620                                                             │
└─────────────────────────────────────────────────────────────────┘
                                  ↓
┌─────────────────────────────────────────────────────────────────┐
│ Generate a harmonic spectral component by applying an inverse   │
│ transform that rotates a spectrum of the weighted phase-coherent│
│ rotated spectral quadrature components from the rotated basis   │
│ to the standard basis                                           │
│ 625                                                             │
└─────────────────────────────────────────────────────────────────┘
                                  ↓
┌─────────────────────────────────────────────────────────────────┐
│ Combine the harmonic spectral component with frequencies of the │
│ audio channel outside of the target frequencies to generate an  │
│ output channel                                                  │
│ 630                                                             │
└─────────────────────────────────────────────────────────────────┘
                                  ↓
┌─────────────────────────────────────────────────────────────────┐
│ Provide the output channel to a speaker                         │
│ 635                                                             │
└─────────────────────────────────────────────────────────────────┘
```

FIG. 6

NONLINEAR ADAPTIVE FILTERBANKS FOR PSYCHOACOUSTIC FREQUENCY RANGE EXTENSION

CROSS-REFERENCE TO RELATED APPLICATION

This application claims the benefit of U.S. Provisional Application No. 62/884,607, filed Aug. 8, 2019, which is incorporated by reference in its entirety.

TECHNICAL FIELD

This disclosure relates generally to audio processing, and more specifically to producing the impression of frequencies beyond a physical driver's bandwidth.

BACKGROUND

The bandwidth of loudspeakers, headphones, and other acoustic actuators is often limited to a sub-domain of the bandwidth of the human auditory system. This is most often a problem in the low frequency region of the audible spectrum, roughly 18 Hz to 250 Hz. It is desirable to modify an audio signal to produce the impression of frequencies beyond the bandwidth of a physical driver. Beyond simply extending the frequency response of the driver, depending on the application, it may be desirable to increase the perception of certain subbands without increasing the amount of physical energy present in those subbands. For example, it may be desirable to use psychoacoustic impressions to decrease the stress on a driver, or to improve power consumption characteristics of a device.

SUMMARY

Some embodiments include a system including a circuitry that provides for psychoacoustic frequency range extension for a speaker. The circuitry generates quadrature components from an audio channel defining a quadrature representation of the audio channel, and generates rotated spectral quadrature components by applying a forward transformation that rotates a spectrum of the quadrature components from a standard basis to a rotated basis. In the rotated basis, the circuitry isolates components of the rotated spectral quadrature components at target frequencies, and generates weighted phase-coherent harmonic spectral quadrature components by applying a scale-independent nonlinearity to the isolated components. The circuitry generates a harmonic spectral component by applying an inverse transformation that rotates a spectrum of the weighted phase-coherent harmonic spectral quadrature components from the rotated basis to the standard basis. The circuitry combines the harmonic spectral component with frequencies of the audio channel outside of the target frequencies to generate an output channel, and provides the output channel to the speaker.

In some embodiments, the harmonic spectral component includes different frequencies from the target frequencies of the audio channel and produces a psychoacoustic impression of the target frequencies when rendered by the speaker.

In some embodiments, the forward transform rotates the spectrum of the quadrature components such that a target frequency is mapped to 0 Hz. The inverse transform rotates the spectrum of the weighted phase-coherent harmonic spectral quadrature components such that 0 Hz is mapped to the target frequency.

In some embodiments, the target frequency is a center frequency of the target frequencies. In some embodiments, the target frequencies include a frequency between 18 Hz and 250 Hz. In some embodiments, the target frequencies are lower than frequencies of the harmonic spectral component.

In some embodiments, the circuitry determines the target frequencies based a reproducible range of the speaker, reduction of power consumption of the speaker, or increased longevity of the speaker.

In some embodiments, the speaker is a component of a mobile device.

In some embodiments, the circuitry is further configured to isolate the components at target magnitudes using a gate function. In some embodiments, the circuitry is further configured to apply a smoothing function to the isolated components.

In some embodiments, the scale-independent nonlinearity includes a weighted summation of Chebyshev polynomials of the first kind with magnitudes factored out.

Some embodiments include a method. The method includes, by a circuitry: generating quadrature components from an audio channel defining a quadrature representation of the audio channel; generating rotated spectral quadrature components by applying a forward transformation that rotates a spectrum of the quadrature components from a standard basis to a rotated basis; in the rotated basis: isolating components of the rotated spectral quadrature components at target frequencies; and generating weighted phase-coherent harmonic spectral quadrature components by applying a scale-independent nonlinearity to the isolated components; generating a harmonic spectral component by applying an inverse transformation that rotates a spectrum of the weighted phase-coherent harmonic spectral quadrature components from the rotated basis to the standard basis; combining the harmonic spectral component with frequencies of the audio channel outside of the target frequencies to generate an output channel; and providing the output channel to a speaker.

Some embodiments include a non-transitory computer readable medium comprising stored instructions that, when executed by at least one processor, configure the at least one processor to: generate quadrature components from an audio channel defining a quadrature representation of the audio channel; generate rotated spectral quadrature components by applying a forward transformation that rotates a spectrum of the quadrature components from a standard basis to a rotated basis; in the rotated basis: isolate components of the rotated spectral quadrature components at target frequencies; and generate weighted phase-coherent harmonic spectral quadrature components by applying a scale-independent nonlinearity to the isolated components; generate a harmonic spectral component by applying an inverse transformation that rotates a spectrum of the weighted phase-coherent harmonic spectral quadrature components from the rotated basis to the standard basis; combine the harmonic spectral component with frequencies of the audio channel outside of the target frequencies to generate an output channel; and provide the output channel to a speaker.

BRIEF DESCRIPTION OF THE DRAWINGS

FIG. 6 is a block diagram of a coefficient operator module, in accordance with some embodiments.

Figure 1:
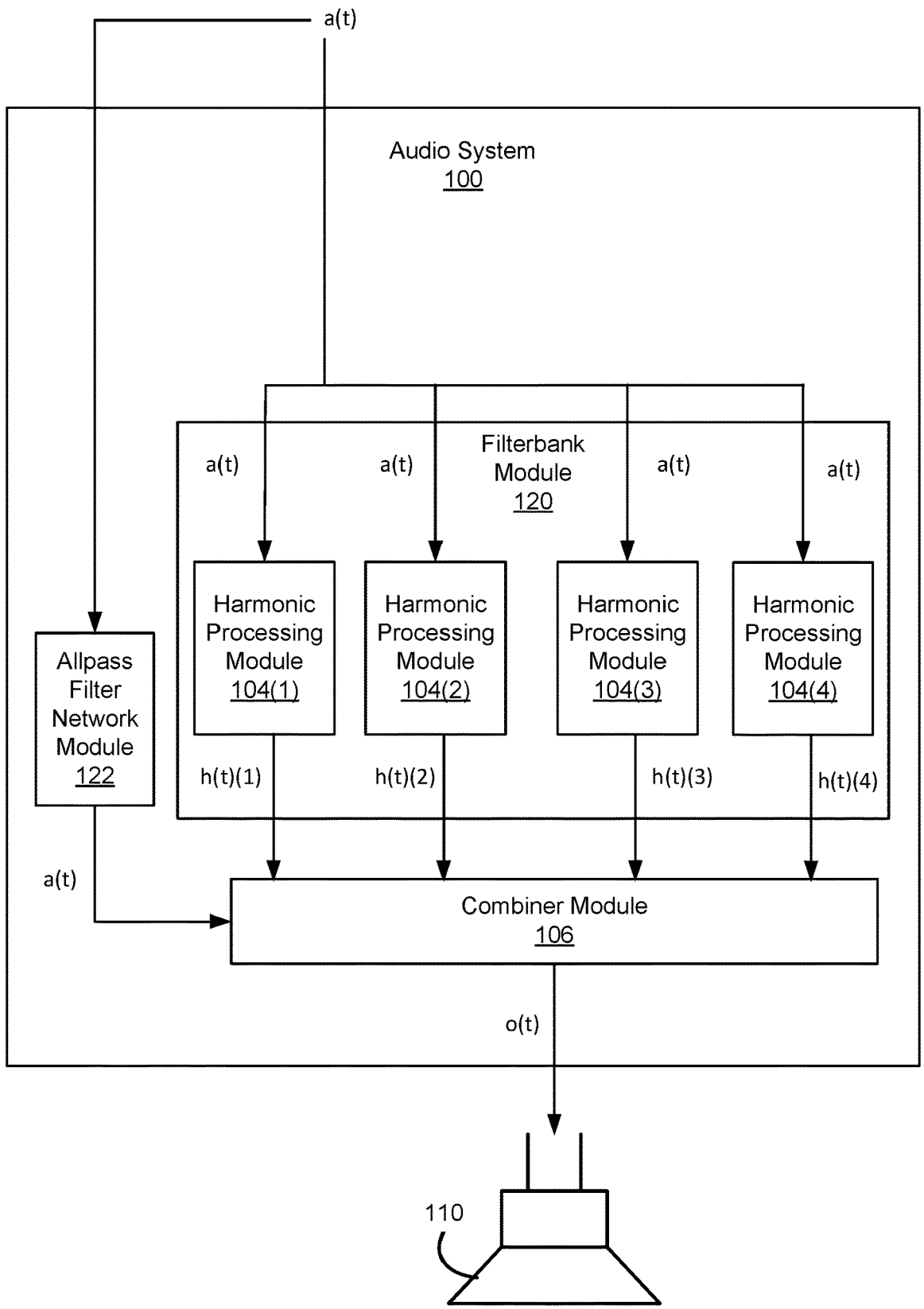
FIG. 1 is a block diagram of an audio system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to providing psychoacoustic frequency range extension. Because the human auditory system responds to cues in a nonlinear way, it is possible to use psychoacoustic phenomena to create a virtual stimulus where the actual stimulus is not feasible. An audio system may include a circuitry that provides an adaptive nonlinear filterbank which uses a highly tunable, scale-independent nonlinearity to generate phase-coherent harmonic spectra from an audio signal. The phase-coherent harmonic spectra may be summed with the original audio signal to produce the impression of frequencies beyond a physical driver's bandwidth.

The adaptive nonlinear filterbank may include multiple harmonic processors. Each harmonic processor includes a non-linear filter that analyzes a targeted subband within the audio signal and resynthesizes data of the subband with a configurable spectral transformation. Although the input spectral envelope is adopted by the output, and although there may be further transformations on the overall amplitude dynamics within the subband or the mixture of subband responses (e.g. compression, gating, etc.), the spectral transformation itself may depend only on frequency and phase content. This affords a high degree of consistency across a wide variety of audio signals.

Advantages of frequency range extension include allowing (e.g., low quality) speakers that are incapable of rendering certain frequencies to produce a psychoacoustic impression of those frequencies. Low cost speakers, such as those commonly found on mobile devices, can provide a high-quality listening experience. The psychoacoustic frequency range extension is achieved by processing audio signals, such as by processing circuitry found in the mobile devices, and without requiring hardware modifications to the speakers. Frequency range extension and frequency response improvement, when achieved without resorting to increasing the amount of physical energy in a suboptimal subband, may be useful for the improving power consumption characteristics and longevity of the speaker drivers.

Audio Processing System

FIG. 1 is a block diagram of an audio system 100, in accordance with some embodiments. The audio system 100 provides frequency range extension for a speaker 110 using a non-linear filterbank module 120. The system 100 includes the filterbank module 120 including harmonic processing modules 104(1), 104(2), 104(3) and 104(4), an allpass filter network module 122, and a combiner module 106. The filterbank module 120 uses a highly tunable, scale-independent nonlinearity to generate phase-coherent harmonic spectra from an audio channel a(t). In some embodiments, the harmonic processing modules 104 may be connected in parallel, as shown. Some embodiments may include series connections harmonic processing modules 104, where the residual of a given harmonic processing module is passed to subsequent harmonic processing modules in a cascade. The system 100 generates an output channel o(t) that is provided to the speaker 110 for rendering. The harmonic processing modules 104(1) through 104(4) of the filterbank module 120 provide for psychoacoustic frequency range extension for the audio channel a(t) beyond the physical bandwidth of the speaker 110.

The filterbank module 120 includes multiple harmonic processing modules 104(n) that generate harmonic spectral components h(t)(n). In some embodiments, each harmonic processing module 104(1) to 104(4) analyzes the entire audio channel a(t) and synthesizes a respective harmonic spectral component h(t)(1) to h(t)(4). In some embodiments, each harmonic processing module may analyze a different targeted subband of the audio channel. Each harmonic spectral component h(t)(n) is a phase-coherent spectral transformation of the data in a(t). Each harmonic spectral component h(t)(n) has weighted phase-coherent harmonic spectra including frequencies different from the frequencies of data in a respective targeted subband of a(t), and produces the psychoacoustic impression of the frequencies of the respective targeted subband when output by the speaker 110. One or more of the harmonic processing modules 104(n) may be selected to generate a harmonic spectral component h(t)(n) to provide psychoacoustic frequency range extension for the speaker 110. In some embodiments, the selection of the targeted subbands may be based on the capabilities of the speaker 110, such as the frequency response of the speaker 110. For example, if the speaker 110 is unable to effectively render low frequencies of sound, then a harmonic processing module 104 may be configured to target a frequency subband component corresponding with the low frequencies, and these may be converted to a harmonic spectral component h(t)(n). The audio system 100 may include one or more harmonic processing modules 104. Additional details regarding a harmonic processing module 104 are discussed in connection with FIGS. 2 through 5.

The allpass filter network module 122 generates a filtered audio channel a(t) to ensure that the audio channel a(t) remains coherent with the output of the filterbank module 120. The allpass filter network 122 compensates for phase changes as a result of the application of harmonic processing modules 104(n) by applying a matching phase change to the input signal a(t). This allows for coherent summing to occur between a signal which is perceptually indistinguishable from a(t), but with manipulated phase, and the harmonic spectral components h(t)(n) generated by the filterbank module 120.

The combiner module 106 generates the output channel o(t) by combining the filtered audio channel a(t) from the allpass filter network module 122 and one or more harmonic spectral components h(t)(n) from the filterbank module 120. The combiner module 106 provides the output channel o(t) to the speaker 110. In some embodiments, the multiple harmonic spectral components h(t)(n) may be attenuated (e.g., with independent tuning) and summed with each other to result in an aggregate filterbank output with the desired nonlinear characteristics. In some embodiments, the summed harmonic spectral components h(t)(n) may be further processed with e.g. high-pass filtering, dynamic range processing, etc., and summed with the (possibly attenuated) filtered audio channel a(t).

Figure 2:
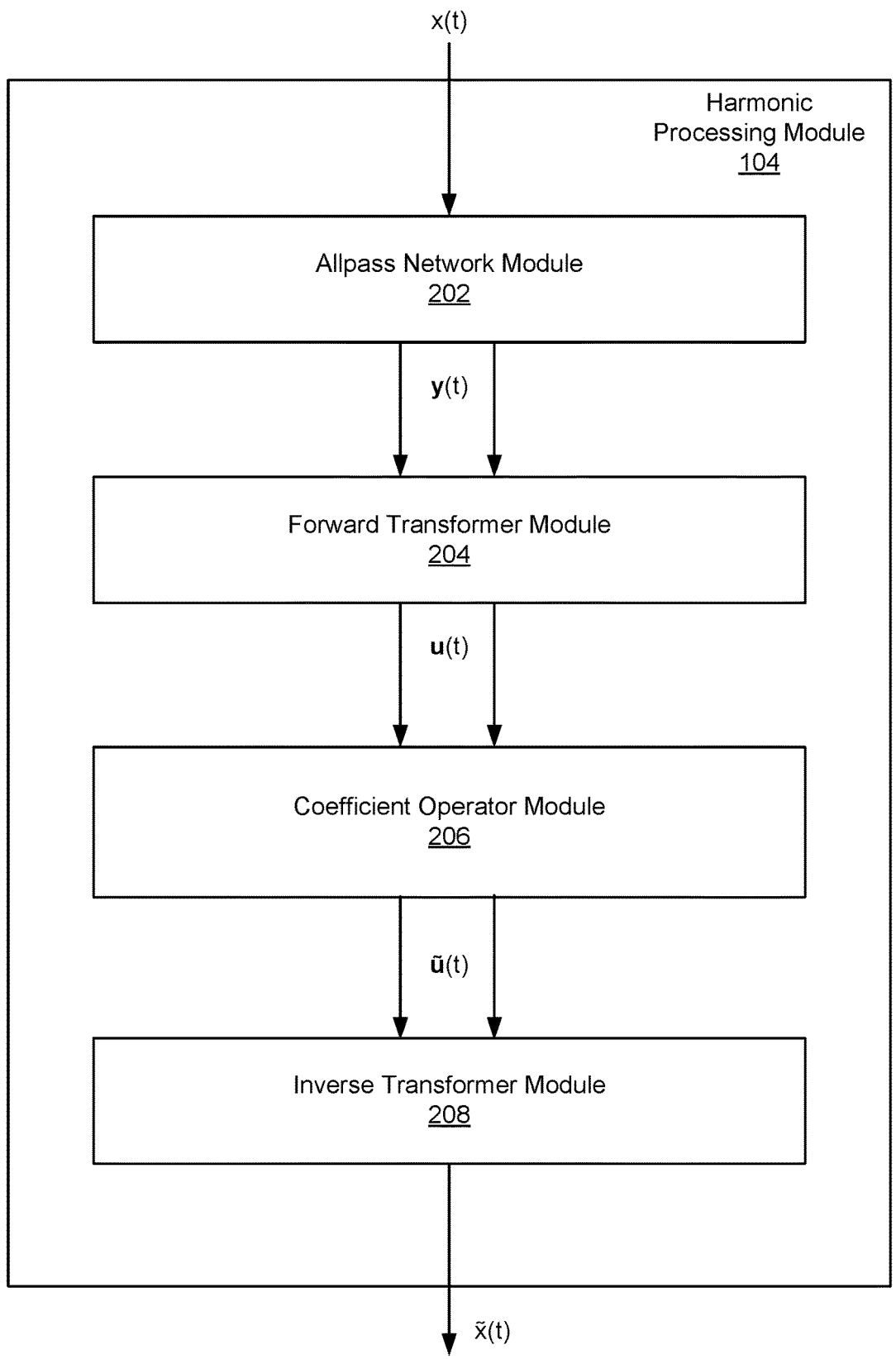
FIG. 2 is a block diagram of a harmonic processing module, in accordance with some embodiments.

FIG. 2 is a block diagram of a harmonic processing module 104, in accordance with some embodiments. The harmonic processing module 104 provides a non-linear filter that analyzes an audio channel and resynthesizes data of a targeted subband with a configurable spectral transformation. The harmonic processing module 104 includes an allpass network module 202, a forward transformer module 204, a coefficient operator module 206, and an inverse transformer module 208. The allpass network module 202 applies a pair of transformations in phase to the audio channel x(t) to generate quadrature components. The forward transformer module 204 applies a forward transformation to the quadrature components that rotates an entire spectrum such that a selected frequency is mapped to 0 Hz to generate rotated spectral quadrature components. The shifting of the selected frequency to 0 Hz is referred to as a change from a standard basis to a rotated basis. The selected frequency may be a center frequency or other frequency of a targeted subband. The coefficient operator module 206 performs operations in the rotated basis, including selectively filtering data based on frequency, magnitude or phase, generating new weighted phase-coherent harmonic spectra from the data using a scale-independent nonlinearity, and modifying the dynamic range of the components to create weighted phase-coherent rotated spectral quadrature components. The inverse transformer module 208 applies an inverse transformation to rotate the spectrum of the weighted phase-coherent rotated spectral quadrature components such that 0 Hz is mapped to the selected frequency to generate a harmonic spectral component x̃(t). The shifting of 0 Hz to the selected frequency is referred to as a change from the rotated basis to the standard basis. The harmonic spectral component x̃(t) may include different frequencies from the targeted subband of the audio channel x(t) but produces a psychoacoustic impression of the frequencies of the targeted subband of the audio channel x(t) when rendered by a speaker.

In some embodiments, the audio component x(t) input to the harmonic processing module 104 may be a subband component a(t)(n). In this example, the selective filtering by the coefficient operator module 206 to select the targeted frequencies may be skipped.

The allpass network 202 converts an audio channel x(t) to a vector y(t) including quadrature components $y_1(t)$ and $y_2(t)$. The quadrature components $y_1(t)$ and $y_2(t)$ include a 90° phase relationship. The quadrature components $y_1(t)$ and $y_2(t)$ and the input signal x(t) include a unity magnitude relationship for all frequencies. The real-valued input signal x(t) is turned quadrature-valued by a matched pair of allpass filters H1 and H2. This operation may be defined via a continuous-time prototype as shown in Equation 1:

$$\mathcal{H}(x(t)) \equiv [\mathcal{H}(x(t))_1 \quad \mathcal{H}(x(t))_2] \equiv \left[ \tilde{x}(t) \quad \frac{1}{\pi}\int_{-\infty}^{\infty} \frac{\tilde{x}(\tau)}{t-\tau} d\tau \right] \quad (1)$$

Some embodiments will not necessarily guarantee a phase relationship between the input (mono) signal and either of the two (stereo) quadrature components $y_1(t)$ and $y_2(t)$, but results in the quadrature components $y_1(t)$ and $y_2(t)$ including the 90° phase relationship and the quadrature components $y_1(t)$ and $y_2(t)$ and the input signal x(t) including the unity magnitude relationship for all frequencies.

Figure 3:
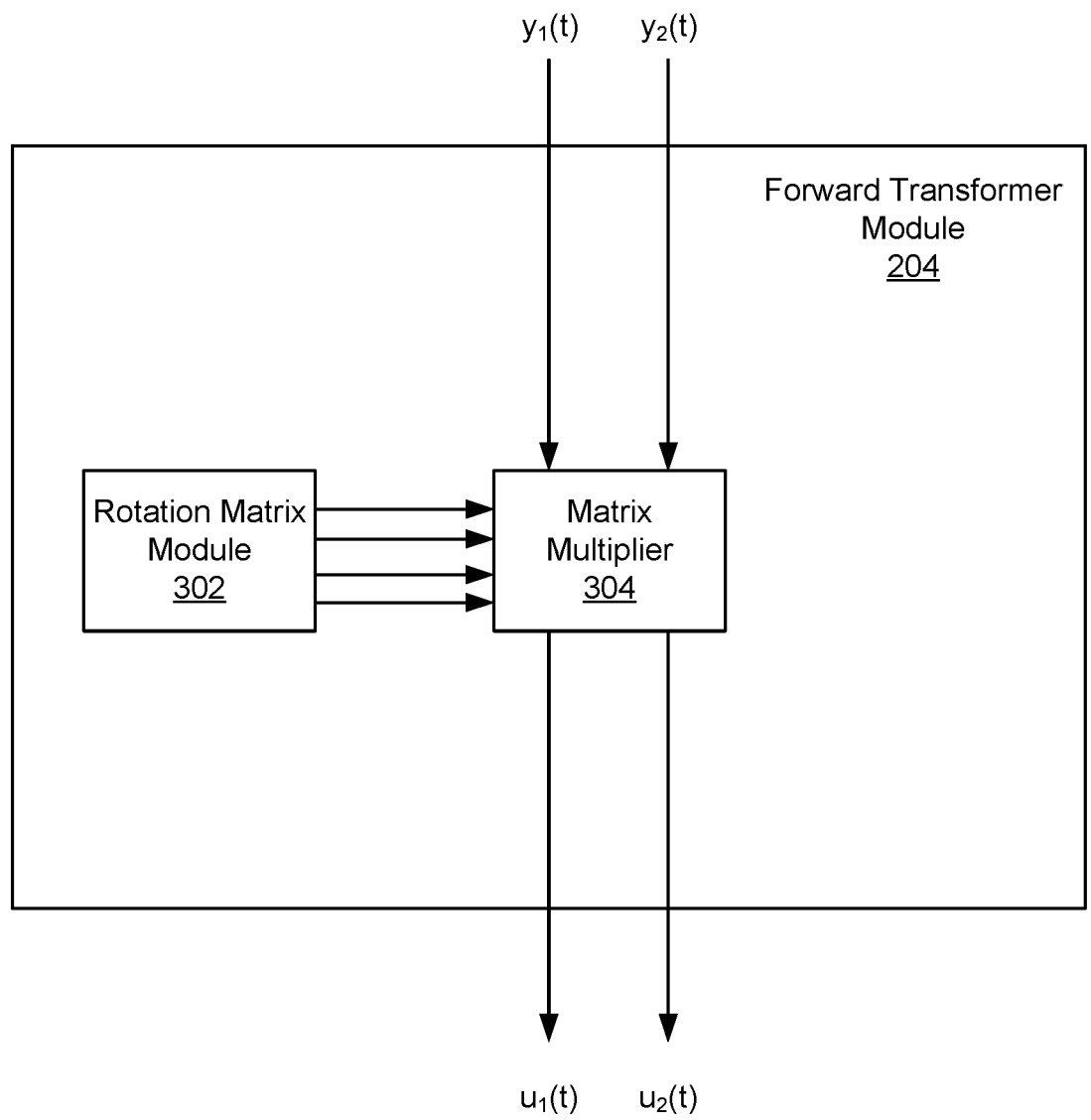
FIG. 3 is a flowchart of a process for psychoacoustic frequency range extension, in accordance with some embodiments.

FIG. 3 is a block diagram of the forward transformer module 204, in accordance with some embodiments. The forward transformer module 204 includes a rotation matrix module 302 and a matrix multiplier 304. The forward transformer module 204 receives the quadrature components $y_1(t)$ and $y_2(t)$ and applies a forward transformation to generate a vector u(t) including rotated spectral quadrature components $u_1(t)$ and $u_2(t)$. This transformation is applied by generating a time-varying rotation matrix via the rotation matrix module 302 and applying it to the quadrature components via the matrix multiplier 304, resulting in the rotated spectral quadrature components u(t). The vector u(t) is a frequency shifted form of the spectrum of the audio signal x(t) and defines a coefficient space where each u at a different time t is defined as a rotated spectral quadrature component. The coefficients defined by the vector u(t) are the result of rotating the spectrum of x(t) such that the desired center frequency θc now lies at 0 Hz.

The forward transform may be applied as a time-varying 2-dimensional rotation on a quadrature signal as defined by Equation 2:

$$u[t] = H_1(x[t])R_2(-\theta_c t) \quad (2)$$

where H1 is an allpass filter, the rotation $R_2(-\theta_c t)$ is of an angular frequency θc and defined by Equation 3:

$$R_2(-\theta_c t) \equiv \begin{bmatrix} \cos(-\theta_c t) & -\sin(-\theta_c t) \\ \sin(-\theta_c t) & \cos(-\theta_c t) \end{bmatrix} \quad (3)$$

Equations 2 and 3 include iterative calls to trigonometry functions. Over an interval where θc is constant, the forward transformation may be calculated by recursive 2D rotations rather than the iterated calls to trigonometry functions. When this optimization strategy is used, the calls to sin and cos are only made when θc is initialized or changed. This optimization recursively defines each matrix $R_2(-\theta_c t)$ as successive powers of an infinitesimal rotation matrix, i.e.: $R_2(-\theta_c(t+1)) \equiv R_2(-\theta_c t)R_2(-\theta_c)$. Since multiplying two 2-by-2 matrices together is a highly optimized calculation on most architectures, this definition may offer performance advantages over the iterated calls to trigonometry functions presented in Equation 3, which is nonetheless equivalent.

Figure 4:
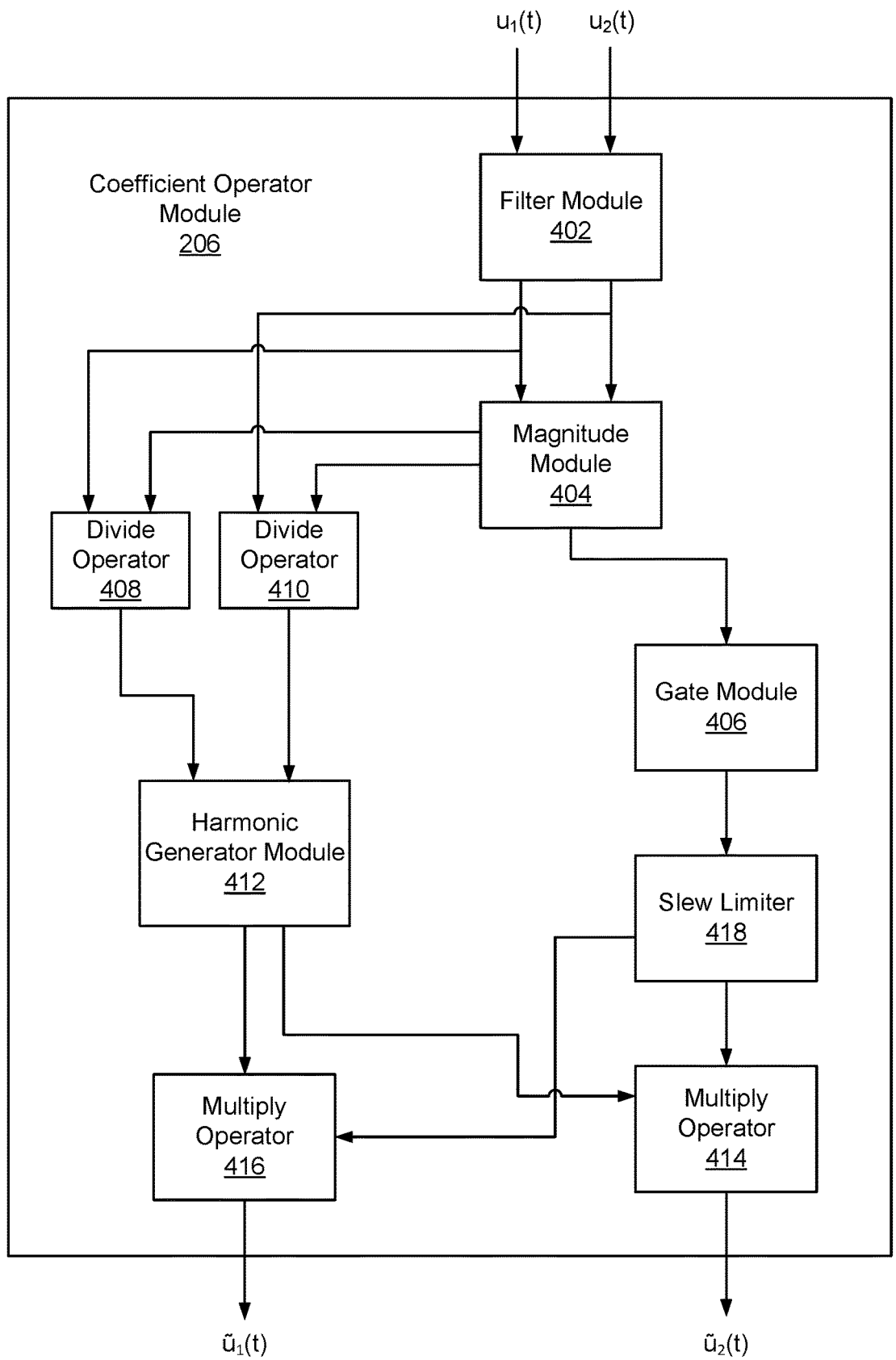
FIG. 4 is a block diagram of a computer, in accordance with some embodiments.

FIG. 4 is a block diagram of the coefficient operator module 206, in accordance with some embodiments. The coefficient operator module 206 includes a filter module 402, a magnitude module 404, a gate module 406, divide operators 408 and 410, a harmonic generator module 412, and multiply operators 414 and 416. The coefficient operator module 206 generates a rotated spectrum ũ(t) including the weighted phase-coherent rotated spectral quadrature components $\tilde{u}_1(t)$ and $\tilde{u}_2(t)$ using the vector u(t) including the rotated spectral quadrature components $u_1(t)$ and $u_2(t)$. In some embodiments, the filter module 402 is a two channel low-pass filter. In this case, the harmonic processing module 104 is configured to perform spectral transformations on a targeted subband centered at $\theta_c$, at a bandwidth which is double the cutoff frequency of the filter module 402. The magnitude module 404 determines the length of the 2D vector, which is used as a measure of instantaneous magnitude, which is factored out of the filtered signal vector, using the divide operators 408 and 410. This magnitude is factored out in order to allow the harmonic generator module 412 to provide harmonics based on the signal whose relationships are not dependent on scale. The harmonic generator module 412 applies a sum of weighted nonlinearities to generate a harmonic spectrum based on the targeted subband of the rotated spectral quadrature components. The magnitude provided by the magnitude module 404 is then used again, this time passed through the gate module 406. The gate module 406 generates a 2D envelope whose instantaneous slope is limited by the slew limiter 418. The resulting slew limited envelope is then applied to the output of the harmonic generator module 412 via the multiply operators 414 and 416. The sum of the weighted harmonics is multiplied with the time-varying envelope to generate the rotated spectrum $\tilde{u}(t)$.

The coefficients of u(t) may be expressed in polar coordinates using Equation 4:

$$\|u[t]\| = \sqrt{u_1[t]^2 + u_2[t]^2} \angle u[t] = a\tan 2(u_1[t], u_2[t]) \quad (4)$$

where the term $\|u(t)\|$ is the instantaneous magnitude of the coefficient signal, and $\angle u(t)$ is the instantaneous phase. These terms can now be manipulated prior to the inverse transformation stage.

The coefficients defined by u(t) are selectively filtered based on their instantaneous magnitude. The filtering may include a gate function applied by the gate module 406 and a slew limiting filter applied by the slew limiter 418. The gate function based on a threshold n may be defined by Equation 5:

$$\mathcal{G}(x) = \begin{cases} 1, & \text{if } x \geq n \\ 0, & \text{if } x < n \end{cases} \quad (5)$$

where the case $x \geq n$ results in keeping the coefficient and the case $x < n$ results in removal of the coefficient. In some embodiments, the case $x < n$ may alternately result in an attenuation rather than complete removal of the coefficient. Because the gate function operates on an estimate of instantaneous magnitude, it is in general more responsive than gates based on real-valued amplitude, while having fewer artifacts.

Time-domain smoothing may be achieved via the slew limiting filter, to further tailor the envelope characteristics of the nonlinear filter's response. A slew limiting filter is a nonlinear filter which saturates the maximum (positive) and minimum (negative) slope of a function. Various types of slew limiting filters or elements may be used, such as a nonlinear filter with independent control over positive and negative saturation points, notated below as $S(x)$. Applying slew limiting to the output of the gate function results in a time-varying envelope: $S(\mathcal{G}\|u[t]\|)$. This may be used to sculpt the envelope of the coefficients.

To generate phase-coherent harmonic spectrum of $\tilde{u}(t)$, the harmonic generator module 412 may use the Chebyshev polynomial of the first kind as defined by Equation 6:

$$T_n(x) = \cos(n\cos^{-1}(x)) \quad (6)$$

These polynomials afford the controlled generation of harmonics by summing their outputs, as defined by Equations 7 or 8:

$$\tilde{u}_1[t] = S(\mathcal{G}(\|\mathcal{F}(u[t])\|)) \sum_{n=0}^{N}(a_n T_n(\mathcal{F}(\cos \angle u[t]))) \quad (7)$$

$$\tilde{u}_2[t] = S(\mathcal{G}(\|\mathcal{F}(u[t])\|)) \sum_{n=0}^{N}(a_n T_n(\mathcal{F}(\sin \angle u[t])))$$

Or, equivalently:

$$\tilde{u}[t] = S(\mathcal{G}(\|\mathcal{F}(u[t])\|)) \sum_{n=0}^{N}\left(a_n T_n\left(\mathcal{F}\left(\frac{u[t]}{\|u[t]\|}\right)\right)\right) \quad (8)$$

where a=[a0,a1,a2 . . . aN] are the harmonic weights applied to each harmonic of the phase-coherent harmonic spectrum and N is the highest generated harmonic. In both representations, the nonlinearity is independent of the input scale. This prevents the output spectrum from varying with the input loudness, and instead allows only variations determined by the spectral weights a. The weights are generally arranged as a decaying series, emulating the harmonic series of naturally-occurring sounds, to which the human auditory system is accustomed. The series of weights are independent of the scale of the incoming audio channel.

Though equivalent, Equation 7 has the benefit of allowing for the direct manipulation of output phase, whereas Equation 8 omits potentially expensive trigonometric functions, operating only on magnitude. The coefficient operator module 206 shown in FIG. 4 depicts operation in accordance with Equation 8.

Figure 5:
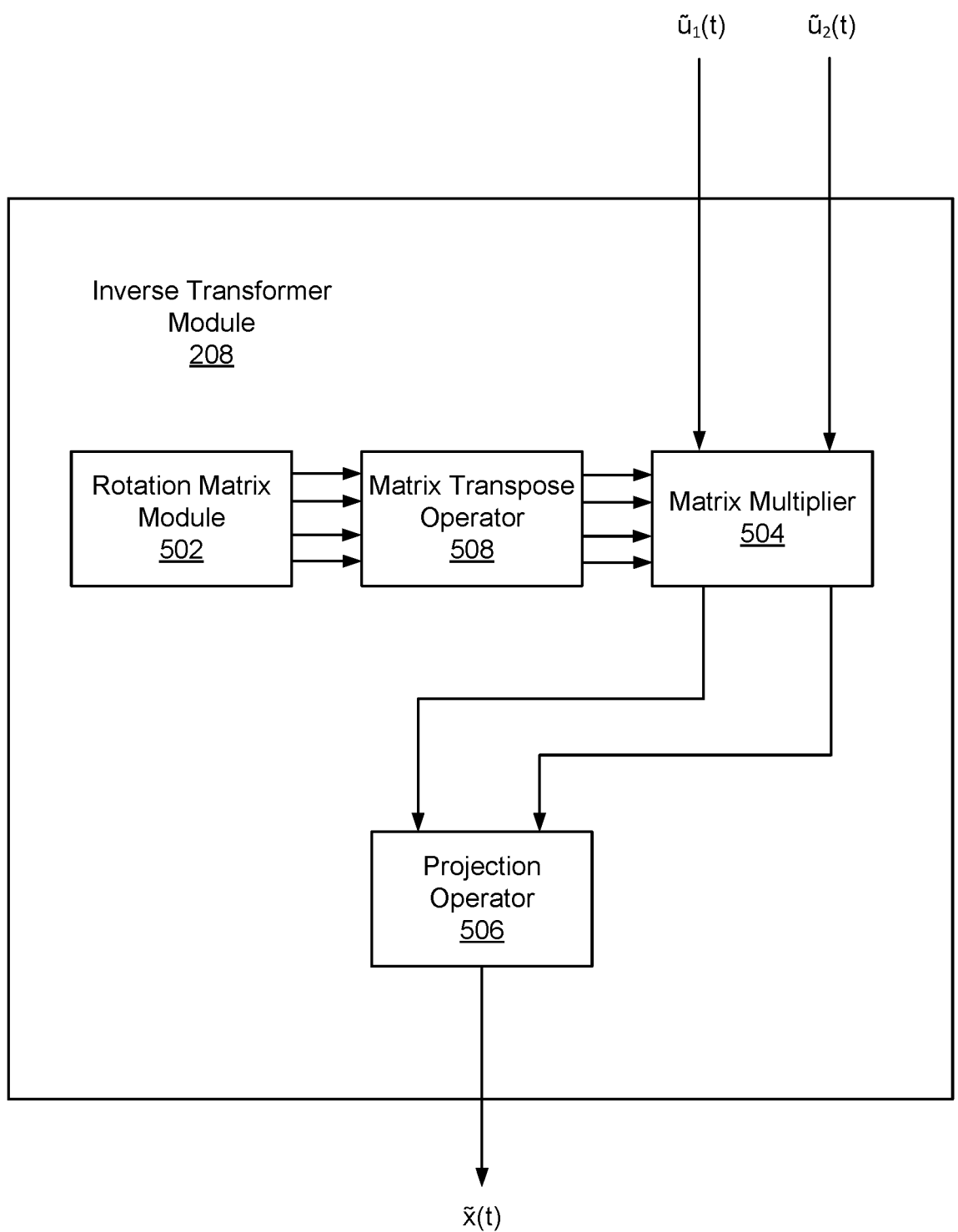
FIG. 5 is a block diagram of a forward transform module, in accordance with some embodiments.

FIG. 5 is a block diagram of the inverse transformer module 208 in accordance with some embodiments. The inverse transformer module 208 includes a rotation matrix module 502, a matrix multiplier 504, a projection operator 506, and a matrix transpose operator 508. The inverse transformer module 208 generates a harmonic spectral component $\tilde{x}(t)$ from the rotated spectrum $\tilde{u}(t)$ including the phase-coherent rotated spectral quadrature components $\tilde{u}_1(t)$ and $\tilde{u}_2(t)$. The rotation matrix module 502 generates a rotation matrix that is identical to the rotation matrix generated by the matrix module 302. The matrix generated by the rotation matrix module 502 is transposed by the matrix transposition operator 508 and applied to the incoming 2D vector of the phase-coherent rotated spectral quadrature components $\tilde{u}_1(t)$ and $\tilde{u}_2(t)$ by the matrix multiplier 504. The resulting 2D vector is projected to a single dimension by the projection operator 506.

To perform the inverse transformation from the rotated basis back into the standard basis, the output spectrum is shifted so that 0 Hz returns to its original location $\theta c$ as defined by Equation 9:

$$\tilde{x}[t] = \tilde{u}[t] R_2(\theta_c t) P \quad (9)$$

where P is a projection from the two-dimensional real coefficient space to a single dimension as defined by Equation 10:

$$P = \begin{bmatrix} 1 \\ 0 \end{bmatrix} \quad (10)$$

Because the forward transform $R_2(-\theta_c t)$ includes orthonormal rotations, the inverse transform is the transpose. This algebraic structure permits caching of the forward transformation matrix and inverting it simply by changing the order in which the coefficients are multiplied. It is in this sense that the rotation matrix module 302 in FIG. 3 and the rotation matrix module 502 in FIG. 5 are said to be identical. The harmonic spectral component $\tilde{x}(t)$ is an example of a harmonic spectral component $h(t)(n)$, and thus may be the response of a nonlinear filter in a larger filterbank.

Example Processes

FIG. 6 is a flowchart of a process 600 for psychoacoustic frequency range extension, in accordance with some embodiments. The process shown in FIG. 6 may be performed by components of an audio system (e.g., audio system 100). Other entities may perform some or all of the steps in FIG. 6 in other embodiments. Embodiments may include different and/or additional steps, or perform the steps in different orders.

The audio system generates 605 quadrature components defining a quadrature representation of an audio channel. The audio channel may be a channel of a multi-channel audio signal, such as a left channel or a right channel of a stereo audio signal. The quadrature components include a 90° phase relationship. The quadrature components and the audio channel include a unity magnitude relationship for all frequencies. In some embodiments, the real-valued input signal is turned quadrature-valued by a matched pair of allpass filters.

The audio system generates 610 rotated spectral quadrature components by applying a forward transformation that rotates a spectrum (e.g., an entire spectrum) of the quadrature components from a standard basis to a rotated basis. The standard basis refers to the frequencies of the input audio channel before the rotation. The rotation may result in a targeted frequency being mapped to 0 Hz. This targeted frequency may be the center of the analysis region of the harmonic processing module, such as the center frequency of a targeted subband for psychoacoustic range extension. The forward transform may be calculated using iterated calls to trigonometry functions as defined by Equation 3 or using an equivalent recursive 2D rotation The audio system isolates 615 components of the rotated spectral quadrature components at target frequencies and target magnitudes. Isolating the components may be performed in the rotated basis. For example, the target frequencies may be isolated using a filter. In some embodiments, the filter removes frequencies above a threshold, and this has the effect of isolating a targeted subband, spanning twice the threshold, symmetrically about the center frequency $\theta_c$ to which the forward transformation was tuned. In some embodiments, the audio system determines the target frequencies based on factors such as a reproducible range of the speaker, reduction of power consumption of the speaker, or increased longevity of the speaker.

The audio system may also isolate components at target magnitudes from the rotated spectral quadrature components, such as by using a gate function. The gate function can either be configured to discard unwanted information in the subband, or to preserve the amplitude envelope. The gate function may further include a slew limiting filter or similar smoothing function.

The audio system generates 620 weighted phase-coherent rotated spectral quadrature components by applying a scale-independent nonlinearity to the isolated components. The weighted phase-coherent rotated spectral quadrature components may be generated in the rotated basis. This rotated basis is well-suited for the generation of designer spectra because it represents a standard-basis signal as a 2-dimensional vector, and because it centers the target frequency about zero. The vector can then be further decomposed into polar coordinates as seen in Equation 4, which are analogous to computing the magnitude and argument of a single bin in a short-time Fourier transform (STFT), a natural descriptor of the information about a particular frequency. This particular implementation has several distinct advantages over STFT representations. The first is that bin information is calculated only as needed, rather than for an entire spectrum. Another advantage is that results are calculated at a temporal resolution required for the proper representation of transient data. Furthermore, the filter, operating analogously to the window function in STFT techniques, is handily tuned for the purpose of separating targeted spectral content from its residue, and, in the case of multiple harmonic processing modules, may have nonuniform tunings. The nonlinearity, whose function is primarily to generate phase-coherent spectra given the phase information in the rotated spectral quadrature component, is made scale-independent by factoring out the instantaneous magnitude of the isolated components on which the module operates. The nonlinearity itself may include a weighted summation of Chebyshev polynomials of the first kind, in accordance with some embodiments. This type of nonlinearity may generate a tunable harmonic spectrum for every component isolated from the rotated spectral quadrature components. Each harmonic may be weighted by a predefined harmonic weight $a_n$.

The audio system generates 625 a harmonic spectral component by applying an inverse transform that rotates a spectrum of the weighted phase-coherent rotated spectral quadrature components from the rotated basis to the standard basis. The inverse transform may rotate the spectrum such that 0 Hz is mapped to the target frequency. The harmonic spectral component includes frequencies different from the targeted frequencies, but produces a psychoacoustic impression of the targeted frequencies when rendered by the speaker. The frequencies of the harmonic spectral component may be within the bandwidth of the speaker while the subband frequencies may be outside of the bandwidth of the speaker. In some embodiments, the subband frequencies are lower than the frequencies of the harmonic spectral component. In some embodiments, the subband frequencies include a frequency between 18 Hz and 250 Hz. In some embodiments, the targeted subband or frequencies may be within the reproducible range of the speaker, but may have been chosen for application-specific reasons, for example, to reduce power consumption of the audio system or to improve the longevity of the speaker.

The audio system combines 630 the harmonic spectral component with frequencies of the audio channel outside of the target frequencies to generate an output channel and provides 635 the output channel to the speaker. In some embodiments, the audio system generates the output channel by combining the harmonic spectral component with the original audio channel, and provides the output channel to the speaker. In some embodiments, the audio system filters the audio channel or other subband components of the audio channel (e.g., excluding the subband component(s) used for frequency range extension) to ensure that the audio channel or other subband components remains coherent with harmonic spectral component, and combines the filtered audio channel or other subband components with the harmonic spectral component to generate the output channel for the speaker. In some embodiments, the combination of the filtered or original audio channel and the harmonic spectral component may be further processed with e.g. equalization, compression, etc., to generate the output channel for the speaker.

Although the process in FIG. 6 is discussed for a single subband component of a single audio channel, the process may be performed to provide frequency range extension for multiple subband components of an audio channel and/or for multiple audio channels of a multi-channel audio signal. In some embodiments, different speakers may have different available bandwidths or frequency responses. For example, a mobile device (e.g., mobile phone) may include unbalanced speakers. Different subband components may be used for frequency range extension for different speakers.

Example Computer

Figure 7:
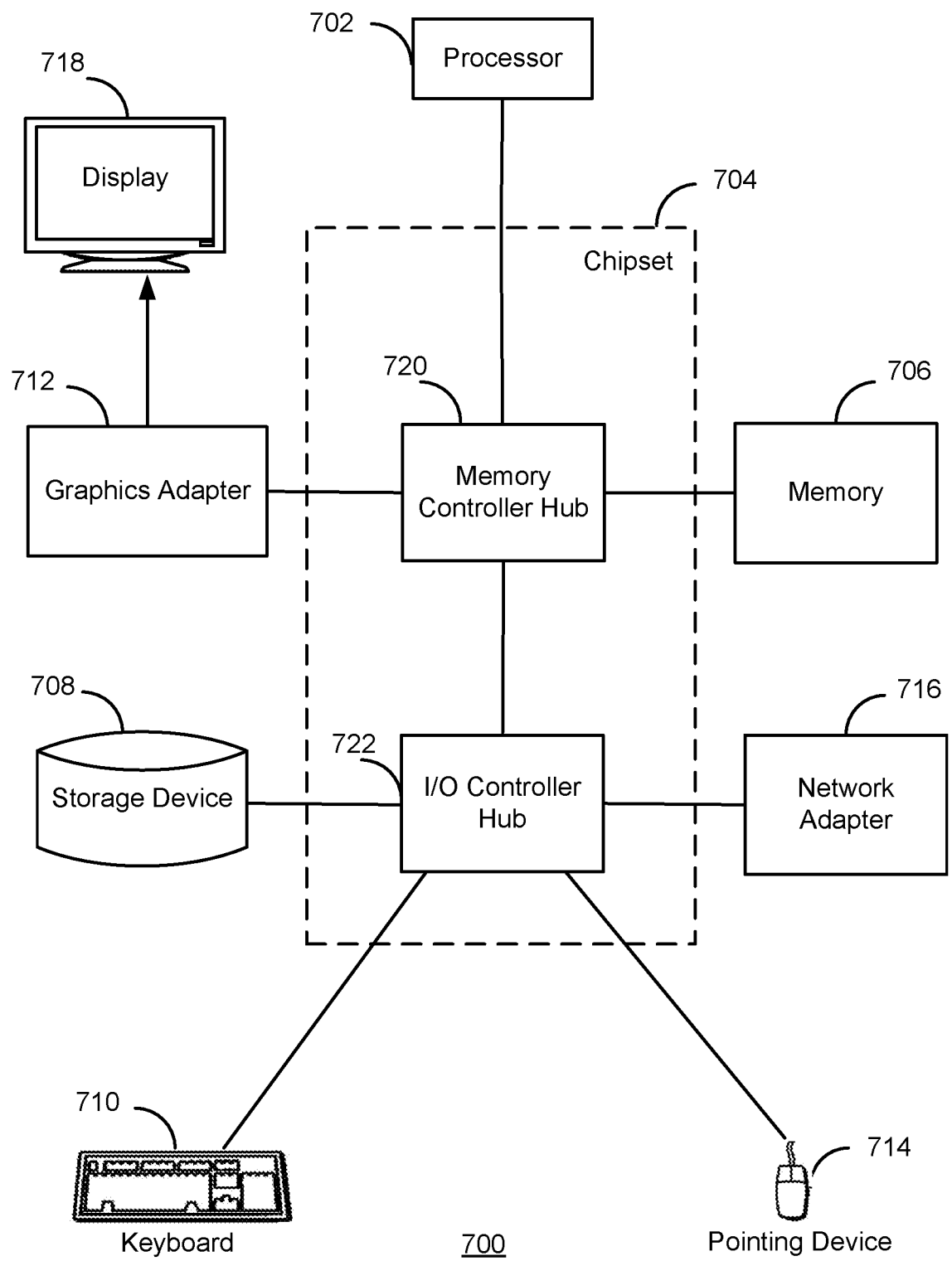
FIG. 7 is a block diagram of an inverse transform module, in accordance with some embodiments.

FIG. 7 is a block diagram of a computer 700, in accordance with some embodiments. The computer 700 is an example of circuitry that implements an audio system, such as the audio system 100. Illustrated are at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display device 718 is coupled to the graphics adapter 712. A storage device 708, keyboard 710, pointing device 714, and network adapter 716 are coupled to the I/O controller hub 722. The computer 700 may include various types of input or output devices. Other embodiments of the computer 700 have different architectures. For example, the memory 706 is directly coupled to the processor 702 in some embodiments.

The storage device 708 includes one or more non-transitory computer-readable storage media such as a hard drive, compact disk read-only memory (CD-ROM), DVD, or a solid-state memory device. The memory 706 holds program code (comprised of one or more instructions) and data used by the processor 702. The program code may correspond to the processing aspects described with reference to FIGS. 1 through 6.

The pointing device 714 is used in combination with the keyboard 710 to input data into the computer system 700. The graphics adapter 712 displays images and other information on the display device 718. In some embodiments, the display device 718 includes a touch screen capability for receiving user input and selections. The network adapter 716 couples the computer system 700 to a network. Some embodiments of the computer 700 have different and/or other components than those shown in FIG. 7.

Circuitry may include one or more processors that execute program code stored in a non-transitory computer readable medium, the program code when executed by the one or more processors configures the one or more processors to implement an audio processing system or modules of the audio processing system. Other examples of circuitry that implements an audio processing system or modules of the audio processing system may include an integrated circuit, such as an application-specific integrated circuit (ASIC), field-programmable gate array (FPGA), or other types of computer circuits.

Additional Considerations

Example benefits and advantages of the disclosed configurations include dynamic audio enhancement due to the enhanced audio system adapting to a device and associated audio rendering system as well as other relevant information made available by the device OS, such as use-case information (e.g., indicating that the audio signal is used for music playback rather than for gaming). The enhanced audio system may either be integrated into a device (e.g., using a software development kit) or stored on a remote server to be accessible on-demand. In this way, a device need not devote storage or processing resources to maintenance of an audio enhancement system that is specific to its audio rendering system or audio rendering configuration. In some embodiments, the enhanced audio system enables varying levels of querying for rendering system information such that effective audio enhancement can be applied across varying levels of available device-specific rendering information.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Upon reading this disclosure, those of skill in the art will appreciate still additional alternative structural and functional designs for a system and a process for audio enhancement using device-specific metadata through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system, comprising:
a circuitry configured to:
generate quadrature components from an audio channel defining a quadrature representation of the audio channel;
generate rotated spectral quadrature components by applying a forward transformation that rotates a spectrum of the quadrature components from a standard basis to a rotated basis;
in the rotated basis:
isolate components of the rotated spectral quadrature components at target frequencies; and
generate weighted phase-coherent harmonic spectral quadrature components by applying a scale-independent nonlinearity to the isolated components;
generate a harmonic spectral component by applying an inverse transformation that rotates a spectrum of the weighted phase-coherent harmonic spectral quadrature components from the rotated basis to the standard basis;

combine the harmonic spectral component with frequencies of the audio channel outside of the target frequencies to generate an output channel; and
provide the output channel to a speaker.

2. The system of claim 1, wherein the harmonic spectral component includes different frequencies from the target frequencies of the audio channel and produces a psychoacoustic impression of the target frequencies when rendered by the speaker.

3. The system of claim 1, wherein:
the forward transform rotates the spectrum of the quadrature components such that a target frequency is mapped to 0 Hz; and
the inverse transform rotates the spectrum of the weighted phase-coherent harmonic spectral quadrature components such that 0 Hz is mapped to the target frequency.

4. The system of claim 1, wherein the target frequency is a center frequency of the target frequencies.

5. The system of claim 1, wherein the target frequencies include a frequency between 18 Hz and 250 Hz.

6. The system of claim 1, wherein the target frequencies are lower than frequencies of the harmonic spectral component.

7. The system of claim 1, wherein the circuitry is further configured to determine the target frequencies based on at least one of:
a reproducible range of the speaker;
reduction of power consumption of the speaker; or
increased longevity of the speaker.

8. The system of claim 1, wherein the speaker is a component of a mobile device.

9. The system of claim 1, wherein the circuitry is further configured to isolate the components at target magnitudes using a gate function.

10. The system of claim 1, wherein circuitry is further configured to apply a smoothing function to the isolated components.

11. The system of claim 1, wherein the scale-independent nonlinearity includes a weighted summation of Chebyshev polynomials of the first kind with magnitudes factored out.

12. A method, comprising, by a circuitry:
generating quadrature components from an audio channel defining a quadrature representation of the audio channel;
generating rotated spectral quadrature components by applying a forward transformation that rotates a spectrum of the quadrature components from a standard basis to a rotated basis;
in the rotated basis:
isolating components of the rotated spectral quadrature components at target frequencies; and
generating weighted phase-coherent harmonic spectral quadrature components by applying a scale-independent nonlinearity to the isolated components;
generating a harmonic spectral component by applying an inverse transformation that rotates a spectrum of the weighted phase-coherent harmonic spectral quadrature components from the rotated basis to the standard basis;
combining the harmonic spectral component with frequencies of the audio channel outside of the target frequencies to generate an output channel; and
providing the output channel to a speaker.

13. The method of claim 12, wherein the harmonic spectral component includes different frequencies from the target frequencies of the audio channel and produces a psychoacoustic impression of the target frequencies when rendered by the speaker.

14. The method of claim 12, wherein:
the forward transform rotates the spectrum of the quadrature components such that a target frequency is mapped to 0 Hz; and
the inverse transform rotates the spectrum of the weighted phase-coherent harmonic spectral quadrature components such that 0 Hz is mapped to the target frequency.

15. The method of claim 12, wherein the target frequency is a center frequency of the target frequencies.

16. The method of claim 12, wherein the target frequencies include a frequency between 18 Hz and 250 Hz.

17. The method of claim 12, wherein the target frequencies are lower than frequencies of the harmonic spectral component.

18. The method of claim 12, further comprising, by the circuitry, determining the target frequencies based on at least one of:
a reproducible range of the speaker;
reduction of power consumption of the speaker; or
increased longevity of the speaker.

19. The method of claim 12, wherein the speaker is a component of a mobile device.

20. The method of claim 12, further comprising, by the circuitry, isolating the components at target magnitudes using a gate function.

21. The method of claim 12, further comprising, by the circuitry, applying a smoothing function to the isolated components.

22. The method of claim 12, wherein the scale-independent nonlinearity includes a weighted summation of Chebyshev polynomials of the first kind with magnitudes factored out.

23. A non-transitory computer readable medium comprising stored instructions that, when executed by at least one processor, configure the at least one processor to:
generate quadrature components from an audio channel defining a quadrature representation of the audio channel;
generate rotated spectral quadrature components by applying a forward transformation that rotates a spectrum of the quadrature components from a standard basis to a rotated basis;
in the rotated basis:
isolate components of the rotated spectral quadrature components at target frequencies; and
generate weighted phase-coherent harmonic spectral quadrature components by applying a scale-independent nonlinearity to the isolated components;
generate a harmonic spectral component by applying an inverse transformation that rotates a spectrum of the weighted phase-coherent harmonic spectral quadrature components from the rotated basis to the standard basis;
combine the harmonic spectral component with frequencies of the audio channel outside of the target frequencies to generate an output channel; and
provide the output channel to a speaker.

24. The non-transitory computer readable medium of claim 23, wherein the harmonic spectral component includes different frequencies from the target frequencies of the audio channel and produces a psychoacoustic impression of the target frequencies when rendered by the speaker.

25. The non-transitory computer readable medium of claim 23, wherein:

the forward transform rotates the spectrum of the quadrature components such that a target frequency is mapped to 0 Hz; and the inverse transform rotates the spectrum of the weighted phase-coherent harmonic spectral quadrature components such that 0 Hz is mapped to the target frequency.

26. The non-transitory computer readable medium of claim 23, wherein the target frequency is a center frequency of the target frequencies.

27. The non-transitory computer readable medium of claim 23, wherein the target frequencies include a frequency between 18 Hz and 250 Hz.

28. The non-transitory computer readable medium of claim 23, wherein the target frequencies are lower than frequencies of the harmonic spectral component.

29. The non-transitory computer readable medium of claim 23, wherein the instructions further configure the at least one processor to determine the target frequencies based on at least one of:

a reproducible range of the speaker;
reduction of power consumption of the speaker; or
increased longevity of the speaker.

30. The non-transitory computer readable medium of claim 23, wherein the speaker is a component of a mobile device.

31. The non-transitory computer readable medium of claim 23, wherein the instructions further configure the at least one processor to isolate the components at target magnitudes using a gate function.

32. The non-transitory computer readable medium of claim 23, wherein the instructions further configure the at least one processor to apply a smoothing function to the isolated components.

33. The non-transitory computer readable medium of claim 23, wherein the scale-independent nonlinearity includes a weighted summation of Chebyshev polynomials of the first kind with magnitudes factored out.

* * * * *